Dec. 18, 1923.
B. H. BLOOD
ADJUSTABLE RING GAUGE
Filed July 10, 1920
1,477,534
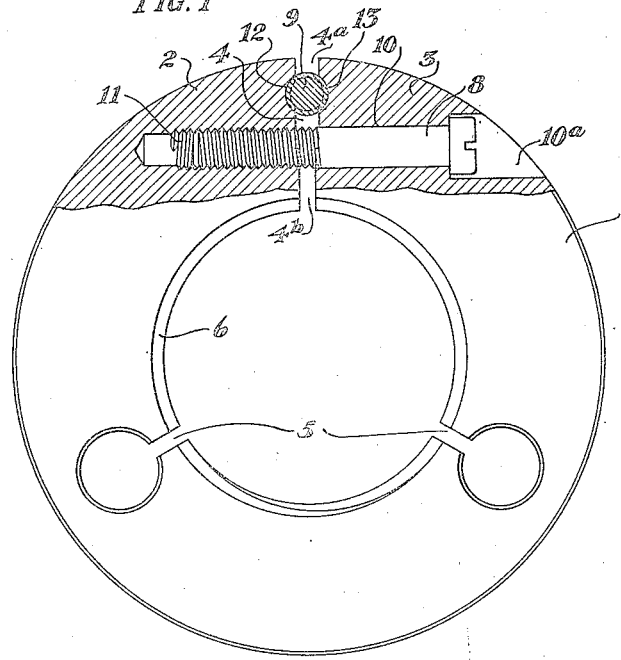
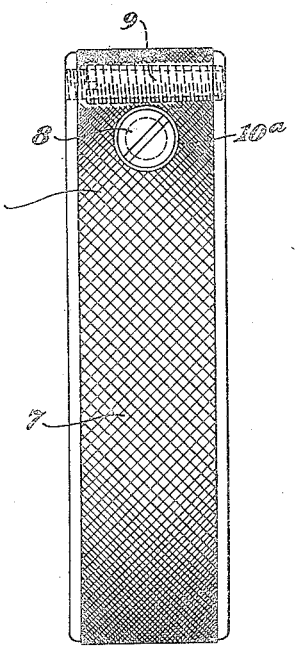
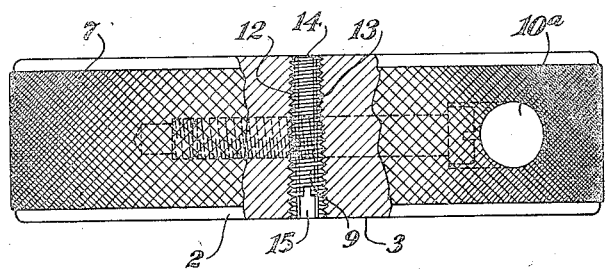
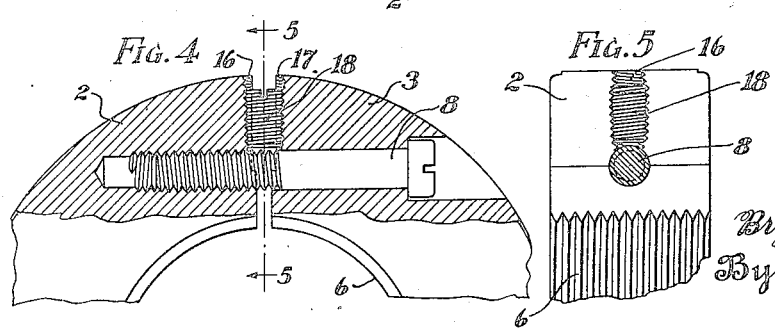
Inventor
Bryant H. Blood.
By S. Jay Teller
Attorney Patented Dec. 18, 1923.

1,477,534

UNITED STATES PATENT OFFICE.

BRYANT H. BLOOD, OF HARTFORD, CONNECTICUT, ASSIGNOR TO PRATT & WHITNEY COMPANY, OF NEW YORK, N. Y., A CORPORATION OF NEW JERSEY.

ADJUSTABLE RING GAUGE.

Application filed July 10, 1920. Serial No. 395,212.

*To all whom it may concern:*

Be it known that I, BRYANT H. BLOOD, a citizen of the United States, residing at Hartford, in the county of Hartford and State of Connecticut, have invented certain new and useful Improvements in Adjustable Ring Gauges, of which the following is a specification.

This invention relates to gauges and particularly to an adjustable ring gauge and the means combined therewith for slightly adjusting the size of the gauge to compensate for wear. In accordance with the invention I provide a gaging body split at one side thereof and provided with improved means adjacent the split portion for accurately adjusting the size of the gauge and for holding the ends thereof in adjusted position and in true alignment. This means preferably comprises the structure illustrated in the accompanying drawing, although it will be readily understood that the structure illustrated may be considerably modified within the scope of the invention as defined by the appended claims.

Referring to the figures of the drawings:

Figure 1 is a front view of a gauge embodying the invention, certain parts being shown in section.

Fig. 2 is a side view thereof.

Fig. 3 is a plan view, certain parts being shown in section.

Fig. 4 is a fragmentary sectional view similar to Fig. 1 but illustrating a modified form of the invention.

Fig. 5 is a fragmentary view taken on the line 5—5 of Fig. 4.

In a gauge such as the ring gauge illustrated in the drawing, and particularly in a thread gauge, it is very essential that the split ends of the gauge not only be held securely in the position to which they are adjusted, but also that the ends be held in true alignment. The present invention not only discloses simpler and more secure means for obtaining the adjustment required and for performing the holding function but such means also acts to perform the additional doweling function of holding the ends of the gauge in true alignment. While in the drawing I have illustrated my invention as applied to a gauge having an internal threaded gaging surface, it will be understood that the invention is not so limited but may with equal facility be applied to similar types of expansible gauges having either external or internal gaging surfaces either smooth or threaded. The scope of the invention is defined in the claims appended hereto.

Referring to the drawing by reference characters, 1 represents a gauge body having two relatively adjustable end sections 2 and 3. The invention is particularly applicable to a female gauge of the split body type, and I have therefore shown a body of this form, the body being integral and having a kerf or split at 4 separating the two sections 2 and 3, this split preferably being wider at the outer portion $4^a$ than at the inner portion $4^b$ for a purpose to be hereinafter described. Preferably there are one or more other kerfs as at 5—5 which do not extend entirely through the body, these kerfs reducing the cross sectional area of the body and permitting the sections 2 and 3 to be more readily adjusted. In the case of a female gauge such as shown, there is provided an interior gaging surface 6 which is adapted to contact with the parts to be gaged. I have illustrated this surface as conforming to screw threads, but it will be understood that as to this there may be variation, as a different surface may be provided, as, for instance, a smooth cylindrical surface. In the female type of gauge shown, I preferably provide a knurled surface 7 on the exterior thereof.

For relatively adjusting the two sections 2 and 3 and for locking them after adjustment, I preferably provide a tapered member mounted between the ends of the gauge for separating the same and a second member engaging both ends of the gauge for drawing the same together into firm contact with the tapered member. The second member preferably comprises a screw, as illustrated in the drawing, and the first member may comprise a tapered screw, as illustrated, or other means, as for example a tapered pin or wedge, a screw however being preferable as will be hereinafter described. As illustrated, the tapered member between the gauge ends extends transversely of the second member and engages the ends of the gauge preferably directly radially outside of the second member and serves to separate the said ends and to hold the ends in alignment. By placing the tapered expanding member between the gauge ends adjacent the periphery of the gauge, such ends may be more easily and accurately separated and adjusted thereby and the inner end portions of the gauge adjacent the bore or gaging surface thereof are left intact and in a relatively close position for gaging purposes. Also by placing the members in the position just decribed the tightening of the gauge ends onto the tapered member by means of the second member will not warp or twist the gauge laterally as would be the case if the gauge ends had contact with the tapered member to one side or the other of the second member. The gauge ends are therefore held in true alignment while being adjusted and tightened as well as after such operations have been completed.

As illustrated in Figs. 1, 2 and 3, I provide two screw threaded members 8 and 9, one screw, as 9, being adapted to separate the ends of the body and thereby increase the effective size of the gauge, and the other screw, as 8, being adapted to draw the ends of the body together and thereby reduce the effective size of the body and compensate for wear. The ends of the gauge ring are bored out as at 10 and 11 to receive the screw 8 therein, the part 11 being screw threaded and the part 10 being counterbored at 10$^a$ to receive the head of the screw 8 therein. Within the wider portion 4$^a$ of the split 4 and preferably substantially parallel with the longitudinal axis of the gauge I mount the second adjusting member, as the taper screw 9. By reference to Figs. 1 and 3, it will be seen that this screw threadedly engages transverse grooves or threads 12 and 13 in the ends of the gauge. It will be seen that the ends of the gauge may be very finely and accurately adjusted by slightly rotating this screw and the threaded engagement of the screw with the grooves positively prevents any relative lateral movement of the gauge ends in a direction parallel to the longitudinal axes of the screw and gauge whereby the ends of the gaging threads 6 might be distorted out of alignment. The outer portion 4$^a$ of the split 4 is preferably made wider than the inner portion 4$^b$, such construction permitting the ends of the threads on the gaging surface 6 to approach each other in close proximity and also permitting only a small arcuate portion of the screw 9 to engage in the threads 12 and 13 whereby such screw in practically all positions of adjustment seats to the bottom of the threads as illustrated in Fig. 1. As illustrated in Fig. 3, the screw 9 is originally positioned with the smaller end flush with one face of the gauge at 14, the other end of the screw being beneath the other face of the gauge whereby is left a space 15 adapted to be sealed with sealing wax after the gauge has been properly adjusted. Most adjustments of the gage will be to compensate for wear and such adjustments will comprise the backing out of the screw 9. The space 15 left in the gauge allows for this adjustment of the screw 9.

In adjusting the gauge, the screw 9 is first set to a position holding the gauge ends at the desired adjustment. The screw 8 is then tightened, thereby clamping the ends 2 and 3 of the gauge into contact with the screw 9. As will be readily seen, in this position the threaded engagement between the ends 2 and 3 of the gauge and the screw 9 holds the gauge ends 2 and 3 secured in exact alignment, such a construction being particularly applicable in a thread gauge where the gaging threads of the ends 2 and 3 of the gauge must exactly align.

In Figs. 4 and 5, I have illustrated one of the several modified forms in which my invention may be embodied. This construction is similar to the other form illustrated, the principal difference being that the tapered member between the gauge ends is arranged radially of the gauge. The gauge ends are provided with radially extending screw-threaded portions 16 and 17 into which is threaded the tapered screw 18, this screw extending transversely of the screw 8 and engaging the ends of the gauge solely directly radially outside of the screw 8. The adjusting operation is the same as heretofore described, and it will be seen that in both forms of the gauge the gauge ends are at all times held in true alignment. It may be stated, however, that the form of my invention illustrated in Figs. 1, 2 and 3 is preferred since in such form the screw threaded engagement of the screw 9 with the screw threads 12 and 13 positively prevents any relative lateral movement of the gauge ends in a direction parallel to the longitudinal axis of the gauge whereby the ends of the gaging threads 6 might be distorted out of alignment.

What I claim is:

1. The combination in a gauge, of an adjustable split body having a gaging surface adapted to contact with the parts to be gaged, means extending through and engaging both ends of the split portion of the gauge for drawing such ends together, and a screw threaded tapered member extending transversely of the said means and engaging the ends of the gauge directly radially outside of the said means for separating the said ends and for holding the ends in alignment, rotation of the said screw being adapted to adjust the tapered portion thereof longitudinally.

2. The combination in a gauge of an adjustable split body having a gaging surface adapted to contact with the parts to be gaged, means engaging both ends of the split portion of the gauge for drawing such ends together, and a screw having a threaded tapered portion extending between the ends of the gauge transversely of the said means for separating the said ends and for holding the ends in alignment, rotation of the said screw being adapted to adjust the tapered portion thereof longitudinally.

3. The combination in a gauge, of an adjustable split body having a gaging surface adapted to contact with the parts to be gaged, means engaging both ends of the split portion of the gauge for drawing such ends together, and a screw having a threaded tapered portion extending between and threadedly engaging both ends of the gauge for separating the said ends and for holding the ends in alignment.

4. The combination in a gauge, of an adjustable split body having a gaging surface adapted to contact with the parts to be gaged, means engaging both ends of the split portion of the gauge for drawing such ends together, and a tapered member extending between the ends of the gauge transversely of the said means and substantially parallel with the longitudinal axis of the gauge for separating the said ends and for holding the ends in alignment, the said member having screw threads thereon for adjusting the same longitudinally.

5. The combination in a gauge, of an adjustable split body having a gaging surface adapted to contact with the parts to be gaged, means engaging both ends of the split portion of the gauge for drawing such ends together, and a screw having a threaded tapered portion extending between the ends of the gauge transversely of the said means and substantially parallel with the longitudinal axis of the gauge for separating the said ends and for holding the ends in alignment.

6. The combination in a gauge, of an adjustable split body having a gaging surface adapted to contact with the parts to be gaged, means engaging both ends of the split portion of the gauge for drawing such ends together, and a screw having a threaded tapered portion extending between and threadedly engaging both ends of the gauge for separating the said ends and for holding the ends in alignment, the screw extending transversely of the said means and substantially parallel with the longitudinal axis of the gauge.

7. The combination in a gauge, of an adjustable split body having a gaging surface adapted to contact with the parts to be gaged, and adjusting means comprising an element engaging both ends of the split portion of the gauge for drawing such ends together and a screw having a threaded tapered portion extending between and threadedly engaging both ends of the gauge for separating the said ends and for holding the ends in alignment, the screw extending transversely of the said element and substantially parallel to the longitudinal axis of the gauge and the said adjusting means being entirely within the outlines of the gauge.

8. The combination in a female gauge, of an adjustable split body having an interior gaging surface adapted to contact with the parts to be gaged, screw means engaging both ends of the split portion of the gauge for drawing such ends together, and a screw having a threaded tapered portion extending between and threadedly engaging the said two gauge ends for separating the said ends and for holding the ends in alignment.

9. The combination in a female gauge, of an adjustable split body having an interior gaging surface adapted to contact with the parts to be gaged, screw means engaging both ends of the split portion of the gauge for drawing such ends together, and a screw having a threaded tapered portion extending between and threadedly engaging the said two gauge ends and substantially parallel with the longitudinal axis of the gauge for separating the said ends and for holding the ends in alignment.

10. The combination in a female thread gauge, of an adjustable split body having an interior screw-threaded gaging surface adapted to contact with the parts to be gaged, screw means engaging both ends of the split portion of the gauge for drawing such ends together, and means substantially parallel with the longitudinal axis of the gauge and engaging transverse grooves in the gauge ends for separating the ends of the gauge and for holding the gaging threads thereof at the split portion in alignment.

11. The combination in a female thread gauge, of an adjustable split body having an interior screw-threaded gaging surface adapted to contact with the parts to be gaged, screw means engaging both ends of the split portion of the gauge for drawing such ends together, and a screw having a threaded tapered portion extending between and threadedly engaging the said two gauge ends radially outside the said screw means for separating the said ends and for holding the ends in alignment, the space between the ends of the gauge being wider at the circumference thereof than at the central opening whereby only a small arcuate portion of the tapered screw engages the ends of the gauge and whereby the adjacent ends of the gaging threads within the gauge are brought into close proximity.

12. The combination in a female thread gauge, of an adjustable split body having an interior screw-threaded gaging surface adapted to contact with the parts to be gaged, screw means engaging both ends of the split portion of the gauge for drawing such ends together, and a screw having a threaded tapered portion extending between and threadedly engaging the said two gauge ends and substantially parallel with the longitudinal axis of the gauge for separating the said ends and for holding the ends in alignment, the space between the ends of the gauge being wider at the circumference thereof than at the central opening whereby only a small arcuate portion of the tapered screw engages the ends of the gauge and whereby the adjacent ends of the gaging threads within the gauge are brought into close proximity.

In testimony whereof, I hereto affix my signature.

BRYANT H. BLOOD.